United States Patent
Bhosale et al.

(10) Patent No.: US 11,219,152 B2
(45) Date of Patent: Jan. 11, 2022

(54) ACTUATOR ASSEMBLY FOR USE WITH A QUICK COUPLER

(71) Applicant: DEERE & COMPANY, Moline, IL (US)

(72) Inventors: Digvijay Bhosale, Pune (IN); Benjamin J. Heimbuch, Cedar Falls, IA (US); Onkar J. Kulkarni, Pune (IN)

(73) Assignee: DEERE & COMPANY, Moline, IL (US)

( * ) Notice: Subject to any disclaimer, the term of this patent is extended or adjusted under 35 U.S.C. 154(b) by 647 days.

(21) Appl. No.: 16/156,679

(22) Filed: Oct. 10, 2018

(65) Prior Publication Data

US 2020/0113117 A1 Apr. 16, 2020

(51) Int. Cl.
*A01B 59/00* (2006.01)
*B62D 49/06* (2006.01)
*F16H 21/44* (2006.01)
*A01B 59/06* (2006.01)

(52) U.S. Cl.
CPC .......... *A01B 59/006* (2013.01); *A01B 59/062* (2013.01); *B62D 49/065* (2013.01); *F16H 21/44* (2013.01)

(58) Field of Classification Search
CPC .. A01B 59/006; A01B 59/062; B62D 49/065; F16H 21/44; B60D 1/04; B60D 1/141
USPC .................................................. 172/439, 272
See application file for complete search history.

(56) References Cited

U.S. PATENT DOCUMENTS

| | | | | |
|---|---|---|---|---|
| 3,539,203 A | * | 11/1970 | Baugh ................. | A01B 59/062 280/504 |
| 3,807,769 A | * | 4/1974 | Thompson et al. ..... | B60D 1/04 172/272 |
| 5,193,623 A | * | 3/1993 | Burette ................ | A01B 59/062 172/47 |
| 2003/0121675 A1 | * | 7/2003 | Gingerich ............ | A01B 59/006 172/274 |
| 2005/0115723 A1 | * | 6/2005 | Ollefs et al. ............. | B60D 1/04 172/439 |

(Continued)

FOREIGN PATENT DOCUMENTS

| | | |
|---|---|---|
| DE | 3240391 A1 | 5/1984 |
| DE | 102019215542 A1 | 4/2020 |
| EP | 1528164 A1 | 5/2005 |

OTHER PUBLICATIONS

German Search Report issued in counterpart application No. 102019215542.1 dated Aug. 6, 2020 (08 pages).

*Primary Examiner* — Thomas B Will
*Assistant Examiner* — Joel F. Mitchell (57) ABSTRACT

An actuator assembly for use with a quick coupler. The actuator assembly includes a manual actuator assembly, a control rod coupled to the manual actuator assembly, and a remote actuator assembly coupled to the control rod. The manual actuator assembly is configured to be hand actuated from outside of the quick part coupler, and configured to move the latching assembly from a locked position to an unlocked position via the control rod. The remote actuator assembly is configured to be remotely actuated from outside of the quick coupler, and configured to move the latching assembly from the locked position to the unlocked position via the control rod.

17 Claims, 6 Drawing Sheets

(56) References Cited

U.S. PATENT DOCUMENTS

| | | | |
|---|---|---|---|
| 2012/0298387 A1* | 11/2012 | Sauermann | B60D 1/141 |
| | | | 172/272 |
| 2015/0093227 A1 | 4/2015 | Faivre | |
| 2016/0278275 A1* | 9/2016 | Conway | A01B 59/062 |
| 2020/0113117 A1 | 4/2020 | Bhosale et al. | |

* cited by examiner

ACTUATOR ASSEMBLY FOR USE WITH A QUICK COUPLER

FIELD OF THE DISCLOSURE

The present disclosure relates to an actuator assembly. More specifically, the present disclosure relates to an actuator assembly for use with a quick coupler, in which the actuator assembly includes both a manual actuator assembly and a remote actuator assembly.

BACKGROUND

Quick couplers are used to attach an implement to a three-point hitch of a work machine. Such couplers typically have an upside-down U-frame with bottom hooks and latching assemblies, which cooperate so as to capture the implement pins in the bottom hooks. Removing the implement requires the operator to manually unlock the latching assemblies. This is an inefficient process, in that the operator needs to stop the work machine, get off of the work machine, walk to and actuate the left manual actuator assembly, and finally walk to and actuate the right manual actuator assembly.

SUMMARY

Disclosed is an actuator assembly for use with a quick coupler. The actuator assembly includes a manual actuator assembly, a control rod coupled to the manual actuator assembly, and a remote actuator assembly coupled to the control rod. The manual actuator assembly is configured to be hand actuated from outside of the quick coupler, and configured to move the latching assembly from a locked position to an unlocked position via the control rod. The remote actuator assembly is configured to be remotely actuated from outside of the quick coupler, and configured to move the latching assembly from the locked position to the unlocked position via the control rod. With the disclosed actuator assembly, the operator of the work machine may unlock the latching assembly manually or remotely.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The detailed description set forth below in connection with the appended drawings is intended as a description of various embodiments of the described subject matter and is not necessarily intended to represent the only embodiment(s). Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Further, it will be further understood that terms such as "left," "right," "up," "down," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. And still further, it will be understood that like numbers refer to like elements throughout, and that like numbers that an include an "R" refer to elements on the right side of the FIGS. that correspond to like elements on the left side of the FIGS.

Figure 1:
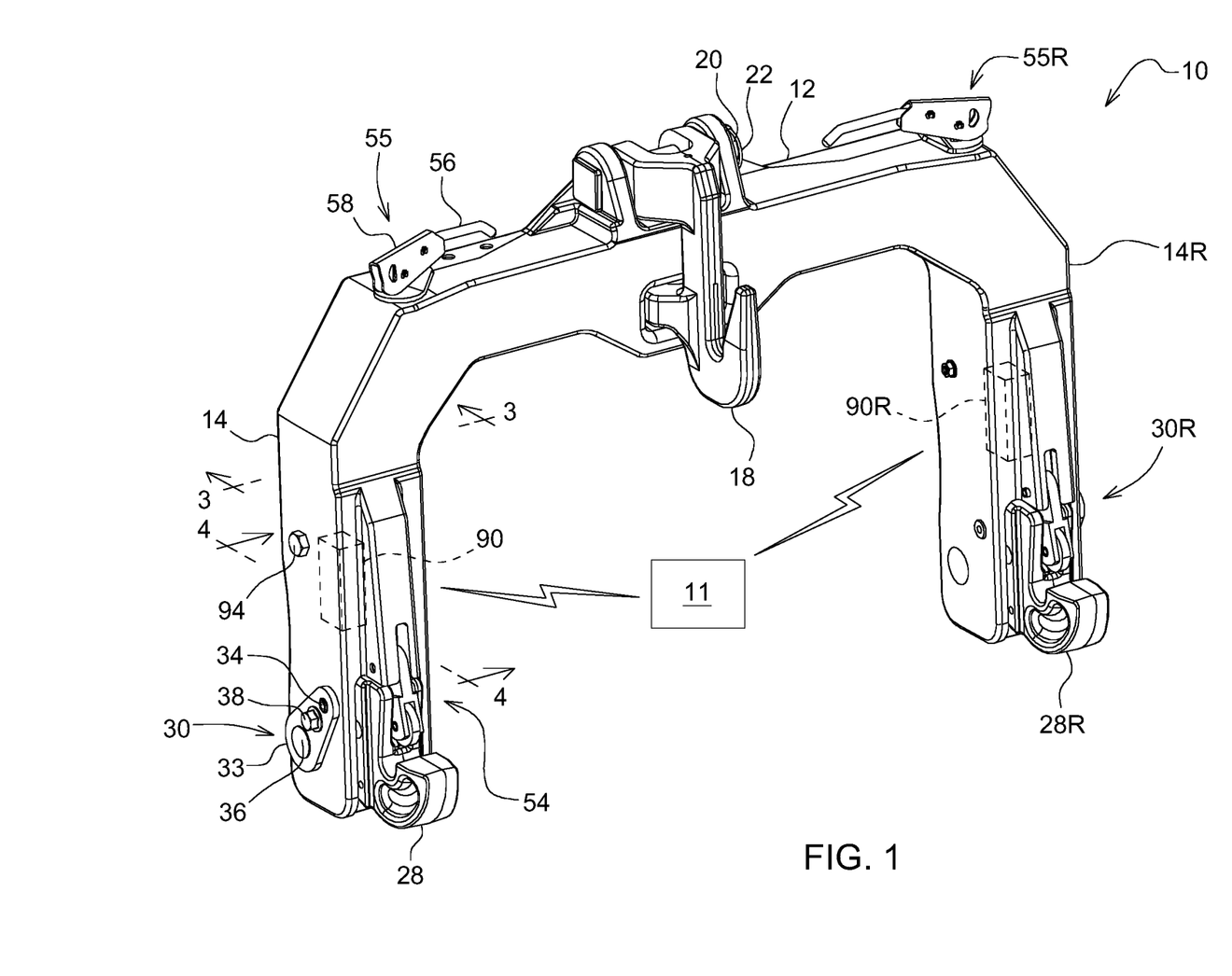
FIG. 1 is a perspective view of a quick coupler and latching assemblies.

Referring to FIG. 1, there is shown a quick coupler 10 for use with a work machine. As one of ordinary skill in the art would recognize, the quick coupler 10 may be coupled to a three-point hitch of the work machine, and it may be used to attach various different implements thereto. Exemplarily, the work machine may be an agricultural tractor, a construction machine, or various other kinds of work machines. And exemplarily, the implement may be a planter, a cultivator, a sprayer, a plow, a mower, a stump grinder, a cement mixer, or various other kinds of implements.

The quick coupler 10 may include a transverse body 12, a left leg 14 extending downwards from a left end of the transverse body 12, and a right leg 14R extending downwards from a right end of the transverse body 12. A top hook 18 may be pinned to a center of the transverse body 12 via a horizontal pin 20 and cotter key 22, and further pinned via a vertical pin (not shown) and cotter key (not shown). A bottom-left hook 28 may be pinned to a bottom of the left leg 14 via a left attachment assembly 30, and a bottom-right hook 28R may be pinned to a bottom of the right leg 14R via a right attachment assembly 30R. The right attachment assembly 30R may be actuated with a lever 55R. The top hook 18, the bottom-left hook 28, and the bottom-right hook 28R may be interchangeable, such that the quick coupler 10 may be, for example, changed from a category 3 quick coupler to a category 4 quick coupler (and vice-versa). To make this change, the top hook 18 may be removed and replaced with a different top hook 18, the bottom-left hook 28 may be flipped in the left leg 14, and the bottom-right hook 28R may be flipped in the right leg 14R.

In some embodiments of the quick coupler 10, such as in the embodiment shown in FIG. 1, the left and right sides of the quick coupler 10 may be similar to one another and/or mirror one another in many respects. As such, moving forward in the detailed description, only the left side of the quick coupler 10 will be described in detail, as such a description is adequate to also describe the right side thereof.

The left attachment assembly 30 may include an attachment plate 33, a first pin 34, a second pin 36, and a cap screw 38. The first pin 34 may be positioned in a first aperture of the attachment plate 33, the left leg 14, and the bottom-left hook 28. The second pin 36 may be positioned in a second aperture of the attachment plate 33, the left leg 14, and the bottom-left hook 28. And the cap screw 38 may be positioned in the third aperture 44 of the attachment plate 33 and in the left leg 14, so as to apply a laterally inward force to the bottom-left hook 28. The first and second pins 34, 36 and the cap screw 38 cooperate to hold the bottom-left hook 28 to the left leg 14. The right attachment assembly 30R may be constructed similarly and act similarly.

Figure 2:
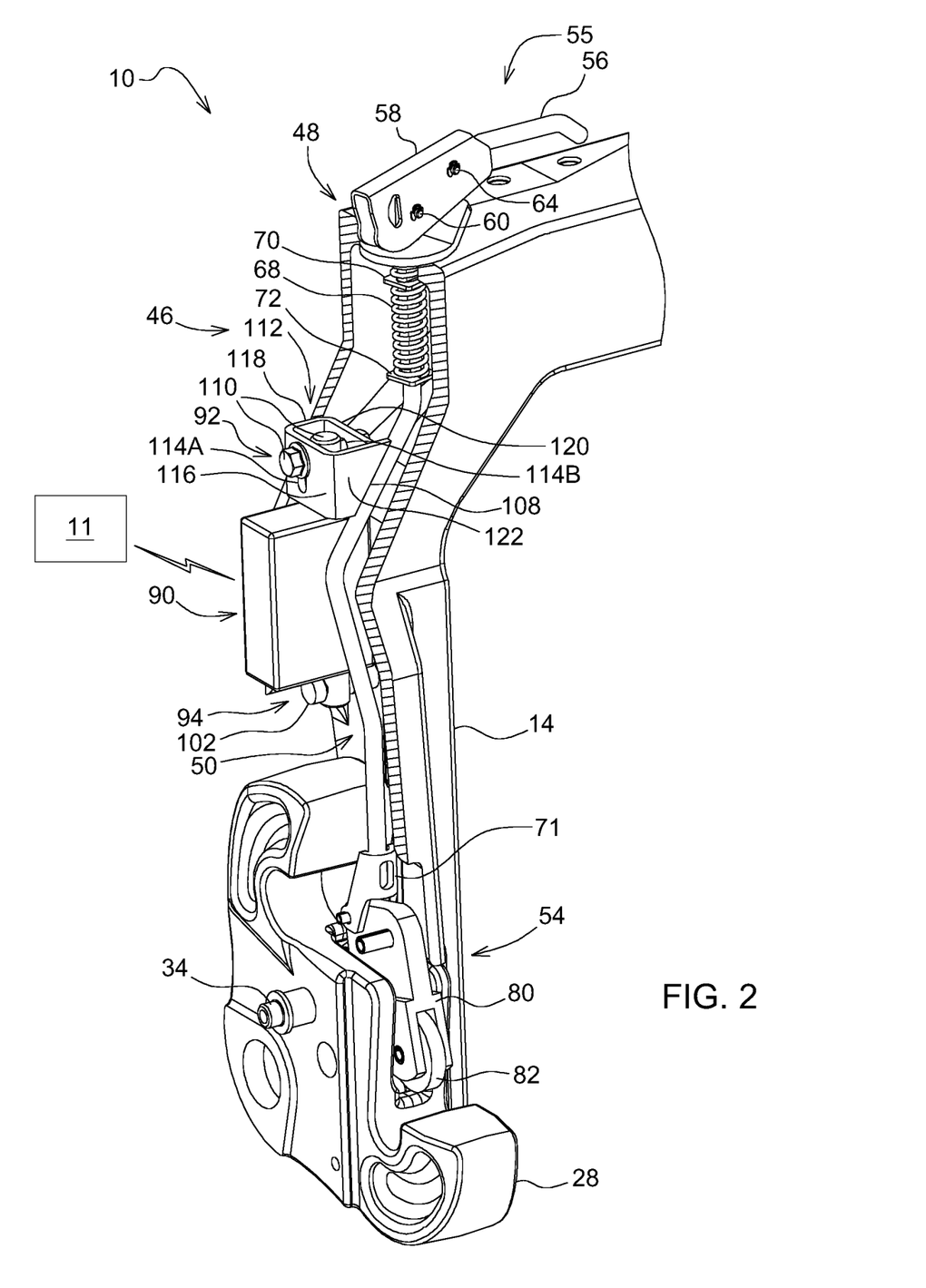
FIG. 2 is a perspective view of a left leg of the quick coupler, a portion of which is cutaway so as to illustrate an actuator assembly.

FIG. 2 is a perspective view of a left leg 14 of the quick coupler 10, a portion of which is cutaway away so as to illustrate an actuator assembly 46. The actuator assembly 46 includes a manual actuator assembly 48, a control rod 50 coupled to the manual actuator assembly 48, and a remote actuator assembly 52 coupled to the control rod 50. A latching assembly 54 is also coupled to the control rod 50. The manual actuator assembly 48 is hand actuated from outside of the quick coupler 10, and moves the latching assembly 54 from a locked position to an unlocked position via the control rod 50. The remote actuator assembly 52 is remotely actuated from outside of the quick coupler 10 via a remote 11, and moves the latching assembly 54 from the locked position to the unlocked position via the control rod 50.

The manual actuator assembly 48 may include a lever 55 having a handle 56 and a plate 58. The plate 58 may be pivotably coupled to the control rod 50 with a first pin 60 and a first pair of snap rings. Similarly, the handle 56 may be pivotably coupled to the plate 58 with a second pin 64 and a second pair of snap rings. The lever 55 may be manually rotated about the first pin 34, such that it can be rotated up to a rotatably up position and rotated down to a rotatably down position. The lever 55 may slide against the plate 58. The lever 55 may be shaped such that it pops into the rotatably up position and such that it tends to stay there when manually moved thereto. Further, the lever 55 may be shaped such that it pops out of the rotatably up position and into the rotatably down position when manually moved thereto.

The manual actuator assembly 48 may also include a spring 68, a top washer 70, and a bottom washer 72. The spring 68 is positioned about the control rod 50, the top washer 70 is positioned about the control rod 50 and above the spring 68, and the bottom washer 72 is positioned about the control rod 50 and below the spring 68. The top washer 70 may be sandwiched between the spring 68 and a bottom-inner wall of the transverse body 12, while the bottom washer 72 may be sandwiched between the spring 68 and a lip of the control rod 50. In some embodiments, the top and bottom washers 70, 72 and a related portion of the control rod 50 may be round. In other embodiments, the top and bottom washers 70, 72 and a related portion of the control rod 50 may be square shaped or various other shapes. In any event, the related portion of the control rod 50 is dimensioned so as to create the lip, such that the bottom washer 72 cannot move downwardly past it. In combination, the spring 68 urges the control rod 50 downwards, and thus urges the latching assembly 54 into the locked position.

The manual actuator assembly 48 may move the latching assembly 54 from the locked position to the unlocked position without assistance from the remote actuator assembly 52. Similarly, the remote actuator assembly 52 may move the latching assembly 54 from the locked position to the unlocked position without assistance of from manual actuator assembly 48.

The remote actuator assembly 52 may include an electric actuator, a hydraulic actuator, and a pneumatic actuator, just to name a few examples. In some embodiments of the remote actuator assembly 52, the electric actuator may be a linear electric actuator. Further, some embodiments of the remote actuator assembly 52 may include an electric actuator, in which an operator of the work machine sends a signal to the electric actuator via a remote 11, such as a mobile phone; a lever, button, or screen in the work machine; or a remote control—just to name a few examples. Communication from the remote 11 to the remote actuator assembly 52 may occur either wirelessly or via a physical electrical connection (i.e., hard wired). In the case of a physical electrical connection, the communication line may be physically connected to the work machine, go into the quick coupler 10 via an opening, and be physically connected to the remote actuator assembly 52.

The electric actuator may be powered by a battery dedicated and built into, for example, the linear electric actuator. Alternatively, the electric actuator may be powered via a physical electrical connection to the work machine (i.e., hard wired). In the case of a physical electrical connection, the electric line may be physically connected to the work machine, go into the quick coupler 10 via an opening, and be physically connected to the remote actuator assembly 52. In such embodiments, the electric line may be the only connection to the remote actuator assembly 52 (i.e., communication from the remote 11 is akin to, for example, providing power via the physical electric connection).

The remote actuator assembly 52 may move the latching assembly 54 from the locked position to the unlocked position, such that movement of the manual actuator assembly 48 is visible to an operator of the quick coupler 10 from inside of the work machine. This is because the remote actuator assembly 52 moves the control rod 50, and the control rod 50 moves the manual actuator assembly 48.

Figure 3:
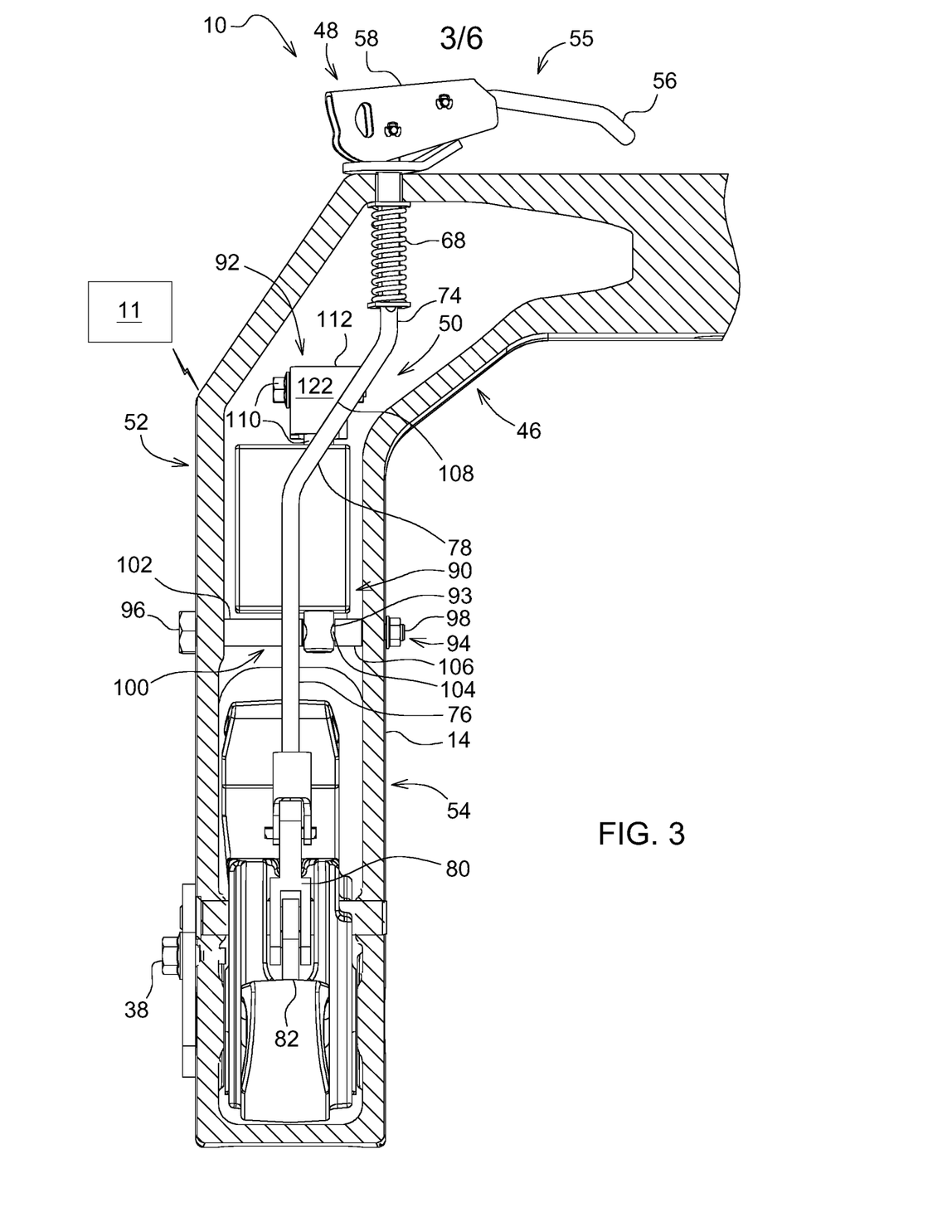
FIG. 3 is a section view taken along lines 3-3 of FIG. 1, showing a rear view of a manual actuator assembly in a rotatably down position, a remote actuator assembly in a retracted position, and the latching assembly in a locked position (i.e., a combination of positions which may be used for installing or using an implement on the quick coupler)

As shown in FIG. 3, the control rod 50 may include a first end portion 74 coupled to the manual actuator assembly 48, a second end portion 76 coupled to the latching assembly 54, and a middle portion 78 positioned therebetween. The remote actuator assembly 52 may be coupled to the middle portion 78, such that movement of the remote actuator assembly 52 is transferred to the first and second end portions 74,76 via the middle portion 78.

Figure 4:
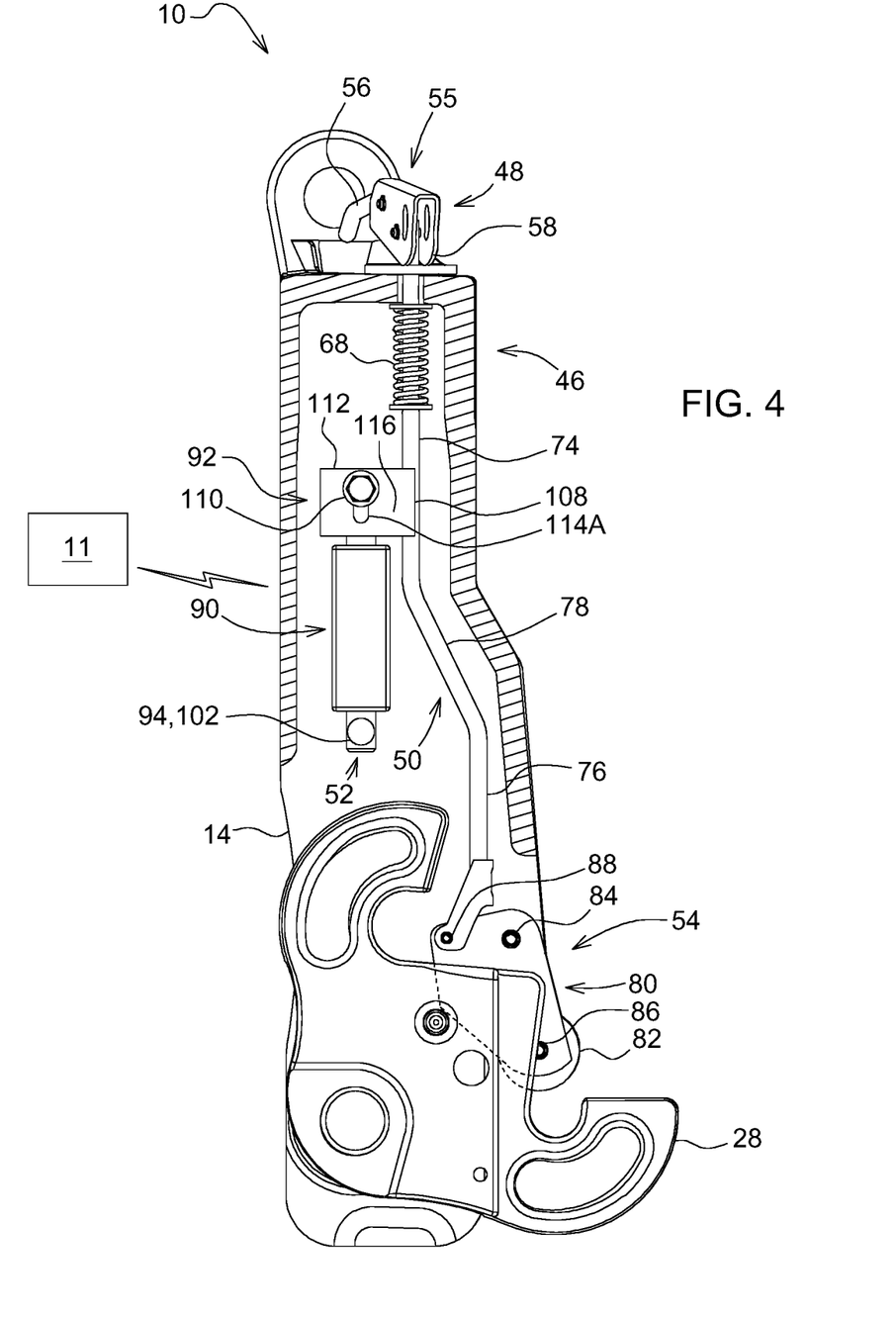
FIG. 4 is a section view taken along lines 4-4 of FIG. 1, showing a side view of the manual actuator assembly in the rotatably down position, the remote actuator assembly in the retracted position, and the latching assembly in the locked position (i.e., a combination of positions which may be used for installing or using an implement on a quick coupler)

When viewed from a rear of the quick coupler 10, the first and second end portions 74,76 may extend vertically inside of the quick coupler 10. Likewise, when viewed from a side of the quick coupler 10, the first and second end portions 74,76 may extend vertically inside of the quick coupler 10. When viewed from the rear of the quick coupler 10 and starting from the second end portion 76, the middle portion 78 may extend upwardly and laterally inwards inside of the quick coupler 10. Finally, as shown in FIG. 4, when viewed from the side of the quick coupler 10 and starting from the second end portion 76, the middle portion 78 may extend forwardly and upwardly inside of the quick coupler 10, while the first and second end portions 74, 76 may extend vertically inside of the quick coupler 10. Shaping the first end portion 74, the middle portion 78, and the second end portion 76 in this way allows for up and down movement of the control rod 50 within the quick coupler 10 (i.e., provides freedom therein).

Referring back to FIG. 2, the latching assembly 54 may include a pivoter 80 that is pivotably coupled to the quick coupler 10 and a roller 82 that is rotatably coupled to the pivoter 80. The pivoter 80 may pivot back-and-forth about a first axis 84 and the roller 82 may roll about a back-and-forth moving second axis 86 positioned below the first axis 84. To do this, the pivoter 80 may be actuated at a back-and-forth moving third axis 88 that is (1) positioned in front of the first axis 84 and (2) in front of and above the second axis 86. The control rod 50 may be pivotably coupled to the pivoter 80 at the third axis 88. A coupler 71 may be used to couple the control rod 50 to the pivoter 80. The coupler 71 may include an upper sleeve with the control rod 50 positioned therein and a lower pair of arms with the pivoter 80 pivotably coupled thereto.

As illustrated, the pivoter 80 may include a single upper portion, and two lower portions positioned below the single upper portion and offset laterally outwards relative to the single upper portion. The first axis 84 may intersect the single upper portion, while the second axis 86 may intersect the two lower portions. The roller 82 may be positioned under and in vertical alignment with the single upper portion. And further, the roller 82 may be positioned between the two lower portions.

The remote actuator assembly 52 may include an anchored portion 90 and a movable portion 92. The anchored portion 90 may be anchored to the quick coupler 10. The anchored portion 90 may include an anchor aperture 93 and an anchor pin 94, wherein the anchor pin 94 is pinned to the left leg 14 to prevent the anchored portion 90 from moving vertically within the quick coupler 10.

As shown, the anchor pin 94 may be a bolt and nut, but other kinds of pins could also be used as well. The anchor pin 94 may include a first end segment 96, a second end segment 98, and a middle segment 100 positioned therebetween. The first and second end segments 96, 98 may be positioned in respective apertures of the quick coupler 10, and the middle segment 100 may be positioned inside of the quick coupler 10 and in the anchor aperture 93. The middle segment 100 may include a large diameter portion 102 that is larger than a diameter of the anchor aperture 93 and may further include a small diameter portion 104 that is smaller than the diameter of the anchor aperture 93. The large diameter portion 102 and a stabilizing cylinder 106 may be positioned on opposite sides of the anchor aperture 93, so as to confine the anchor aperture 93. The small diameter portion 104 may be positioned in the anchor aperture 93 and in the stabilizing cylinder 106.

The movable portion 92 may be movable relative to the anchored portion 90. The movable portion 92 may be configured to initiate back-and-forth movement of the middle portion 78, at a connection point 108, between the movable portion 92 and the middle portion 78. For example, as illustrated, the middle portion 92 may be directly coupled to the middle portion 78. The movable portion 92 may include a first mover 110 and a second mover 112. The first mover 110 may be positioned in slots 114A, 114B of the second mover 112, and the second mover 112 may be fixed to the control rod 50 so as to always move therewith. Other embodiments of the second mover 112 may only include one slot or even different shapes, depending on the construction of the first embodiment 110, for example. When the first mover 110 extends, the first mover 110 may be configured to move the second mover 112 via an end of the slot 114. And additionally, when the first mover 110 extends, the second mover 112 is configured to move the manual actuator assembly 48 via the control rod 50 and to move the latching assembly 54 from the locked position to the unlocked position via the control rod 50. As shown, the first mover 110 may include a linearly actuating rod and a transversely positioned pin (e.g., bolt and nut) that extends through an aperture of the linearly actuating rod and through the slots 114A, 114B.

As illustrated, the second mover 112 may include a first sidewall 116, a second sidewall 118, a third sidewall 120 opposite of the first sidewall 116, and a fourth sidewall 122 opposite of the second sidewall 118. The first sidewall 116 may include a vertical slot 114a, and the fourth sidewall 122 may include a matching vertical slot 114b that is opposite of and aligned with the vertical slot 114A. In such an embodiment, the first mover 110 may be positioned in the vertical slots 114A, 114B. This allows the first mover 110 to slide relative to the vertical slots 114A, 114B when the manual actuator assembly 48 moves the latching assembly 54 from the locked position to the unlocked position and vice-versa.

FIG. 3 shows a rear view of the left leg 14, a portion of which is cutaway, while FIG. 4 shows a side view of the left leg 14, also with a portion of which is cutaway. In both FIGS. 3 and 4, the manual actuator assembly 48 is in the rotatably down position, the remote actuator assembly 52 in the retracted position, and the latching assembly 54 in the locked position. This combination of positions is used either when installing the implement on the quick coupler 10 or when using the implement with the quick coupler 10. During installation, the quick coupler 10 is raised up into the implement. The implement snaps into place by forcing the latching assembly 54 to momentarily retract (despite the spring 68 urging the latching assembly 54 in the opposite direction). In doing this, the roller 82 rolls along the implement. During use, the latching assembly 54 latches the implement to the quick coupler 10. This allows the work machine, the quick coupler 10, and the implement to work in unison.

Figure 5:
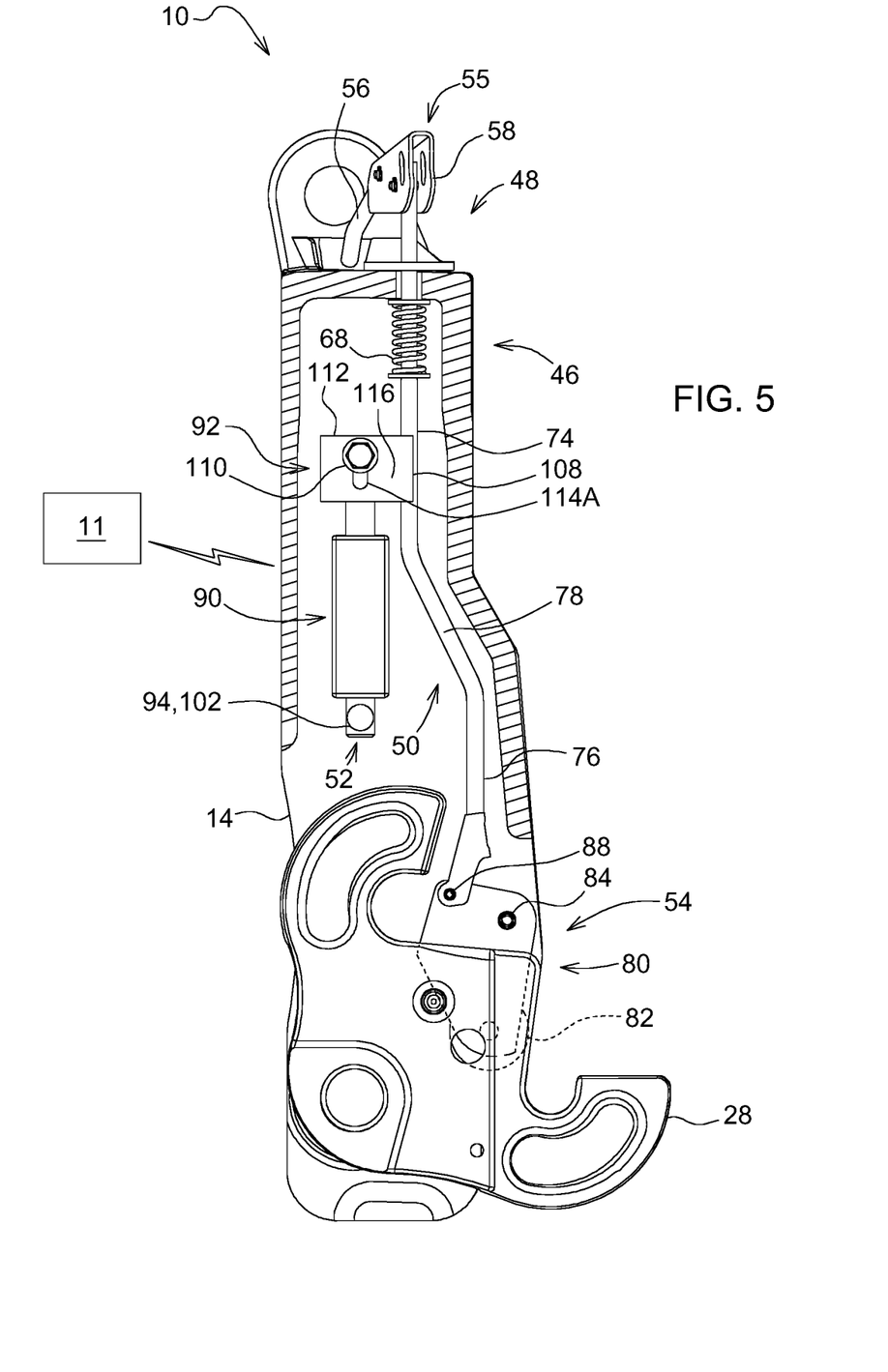
FIG. 5 is similar to FIG. 4, but showing the manual actuator assembly in a rotatably down position, the remote actuator assembly in an extended position, and the latching assembly in an unlocked position (i.e., a combination of positions which may be used for removing an implement from the quick coupler)

Referring to FIG. 5, it is similar to FIG. 4, but FIG. 5 illustrates the manual actuator assembly 48 in the rotatably down position, the remote actuator assembly 52 in the extended position, and the latching assembly 54 in the unlocked position. This combination of positions is used to remove the implement from the quick coupler 10. To do this, the remote actuator assembly 52 is moved to the extended position. The remote actuator assembly 52 extends and thus moves the latching assembly 54 from the locked position to the unlocked position via the control rod 50. The remote actuator assembly 52 transfers movement to the control rod 50 via the first and second movers 110, 112 moving upwards.

When the remote actuator assembly 52 extends, the roller 82 rolls relative to the pivoter 80. And in addition, the roller 82 rolls relative to and in contact with an implement, so as to reduce the forces necessary to extend the remote actuator assembly 52, to move the control rod 50 upwards, and to move the latching assembly 54 to the unlocked position. Without the roller 82, the remote actuator assembly 52 may be unable to extend or may need to be significantly more powerful than would be the case relative an embodiment that utilizes the roller 82.

When the remote actuator assembly 52 extends, it may move the control rod 50 upwards and also move a portion of the manual actuator assembly 48 upwards. More specifically, the control rod 50 may move the lever 55 and the handle 56 upwards. The movement of the lever 55 and handle 56 may be noticeable to an operator who is in the work machine. For example, the operator may be able to view the movement from his seat and through a window of the operator station. By being able to see this movement, the operator knows that the remote actuator assembly 52 is extended and that the latching assembly 54 is unlocked. This may signal to the operator to retract the remote actuator assembly 52 if the latching assembly 54 needs to be locked (e.g., to operate the implement). Or alternatively, this may signal to the operator that the latching assembly 54 is unlocked and that the implement can be removed from the quick coupler 10.

Figure 6:
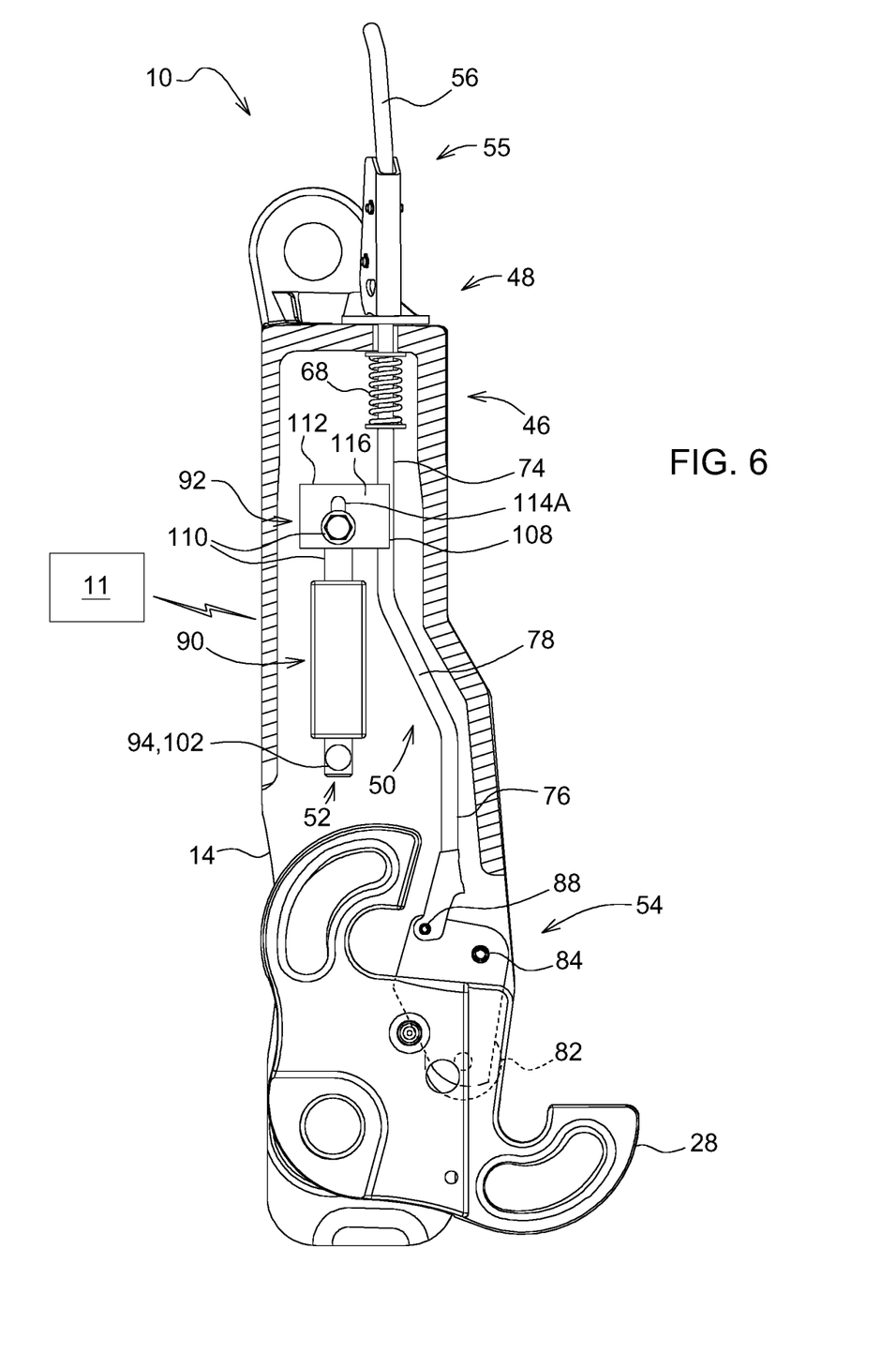
FIG. 6 is similar to FIG. 4, but showing the manual actuator assembly in a rotatably up position, the remote actuator assembly in the retracted position, and the latching assembly in an unlocked position (i.e., a combination of positions which may be used for removing an implement from the quick coupler).

Referring to FIG. 6, it is similar to FIG. 4, but FIG. 6 illustrates the manual actuator assembly 48 in the rotatably up position, the remote actuator assembly 52 in the retracted position, and the latching assembly 54 in the unlocked position. This combination of positions is used to remove the implement from the quick coupler 10. To do this, the manual actuator assembly 48 is manually rotated (i.e., by hand by the operator of the work machine) to the rotatably up position. And from this, the latching assembly 54 moves from the locked position to the unlocked position via the control rod 50. The roller 82 rolls relative to the pivoter 80 and also relative to and in contact with an implement, so as to reduce the forces necessary to extend the remote actuator assembly 52, to move the control rod 50 upwards, and the move the latching assembly 54 to the unlocked position.

As shown in FIG. 6, when the remote actuator assembly 52 is in the retracted position and the manual actuator assembly 48 is in the rotatably up position, the first mover 110 is positioned relatively downwards and the second mover 112 is positioned relatively upwards. To get to this position, as the manual actuator assembly 48 is rotated, the second mover 112 moves upwards relative to the first mover 110. This freedom provided between the first and second movers 110, 112 is available, as a result of the first mover 110 being positioned in slots 114A, 114B of the second mover 112.

By using the slots 114A, 114B, the remote actuator assembly 52 and the manual actuator assembly 48 slidably cooperate with one another, such that the operator does not have to choose between the options. Rather, in the illustrated quick coupler 10, the manual actuator assembly 48 is an option for disengaging the latching assembly 54 from the latched position, and the remote actuator assembly 52 is a concurrently available option for disengaging the latching assembly 54 from a latched position. And from this, having the remote actuator assembly 52 in combination with the complimentary manual actuator assembly 48 provides two options for removing the implement from the quick coupler 10. Thus, if the operator is seated in the work machine, then the operator has easy access to the remote actuator assembly 52. And if the operator is outside of the work machine to disengage hydraulic hoses or wiring harnesses, for example, then the operator has easy access to the manual actuator assembly 48.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. An actuator assembly for use with a quick coupler, the actuator assembly comprising:
   a manual actuator assembly including a lever, the manual actuator assembly configured to be hand actuated from outside of the quick coupler;
   a control rod coupled to the manual actuator assembly;
   a remote actuator assembly including an anchored portion and a movable portion, the remote actuator assembly coupled to the control rod, the remote actuator assembly configured to be remotely actuated from outside of the quick coupler; and
   a latching assembly including a pivoter pivotably coupled to the control rod;
   wherein the manual actuator assembly is configured to move the latching assembly from a locked position to an unlocked position via the control rod;
   wherein the remote actuator assembly is configured to move the latching assembly from the locked position to the unlocked position via the control rod;
   wherein the control rod includes a first end portion pivotably coupled to the manual actuator assembly, a second end portion pivotably coupled to the latching assembly, and a middle portion positioned therebetween;
   wherein the anchored portion is anchored to the quick coupler and the movable portion is movable relative to the anchored portion and is configured to initiate back-and-forth movement of the middle portion at a connection point between the movable portion and the middle portion;
   wherein the movable portion includes a first mover and a second mover, the first mover is positioned in a slot of the second mover, the second mover is fixed to the control rod so as to always move therewith; and
   wherein the first and second movers slide relative to one another when the manual actuator assembly moves the latching assembly from the locked position to the unlocked position and vice-versa.

2. The actuator assembly of claim 1, wherein the remote actuator assembly includes an electric actuator.

3. The actuator assembly of claim 1, wherein the manual actuator assembly is configured to move the latching assembly from the locked position to the unlocked position without assistance from of the remote actuator assembly.

4. The actuator assembly of claim 1, wherein the remote actuator assembly is configured to move the latching assembly from the locked position to the unlocked position without assistance of the manual actuator assembly.

5. The actuator assembly of claim 1, wherein the remote actuator assembly is configured to move the latching assembly from the locked position to the unlocked position, such that movement of the manual actuator assembly is visible to an operator of the quick coupler, from a seat of the a work machine, as a result the remote actuator assembly moving the control rod and the control rod moving the manual actuator assembly.

6. The actuator assembly of claim 1, wherein the control rod includes a first end portion coupled to the manual actuator assembly, a second end portion coupled to the latching assembly, and a middle portion positioned therebetween; and
wherein the remote actuator assembly is coupled to the middle portion, such that movement of the remote actuator assembly is transferred to the first and second end portions via the middle portion.

7. The actuator assembly of claim 6, wherein when viewed from a rear of the quick coupler, the first and second end portions extend vertically inside of the quick coupler; and
wherein when viewed from the rear of the quick coupler and starting from the second end portion, the middle portion extends upwardly and laterally inwards inside of the quick coupler.

8. The actuator assembly of claim 6, wherein when viewed from a side of the quick coupler, the first and second end portions extend vertically inside of the quick coupler; and
wherein when viewed from the side of the quick coupler and starting from the second end portion, the middle portion extends forwardly and upwardly inside of the quick coupler.

9. The actuator assembly of claim 1, wherein the latching assembly includes a roller that is rotatably coupled to the pivoter; and
wherein the remote actuator assembly is configured to move the latching assembly from the locked position to the unlocked position via the control rod, such that the roller rolls relative to the pivoter and also rolls relative to and in contact with an implement.

10. The actuator assembly of claim 9, wherein the pivoter pivots back-and-forth about a first axis and the roller rolls about a back-and-forth moving second axis positioned below the first axis.

11. The actuator assembly of claim 10, wherein the pivoter is actuated at a back-and-forth moving third axis that is positioned in front of the first axis and in front of and above the moving second axis.

12. The actuator assembly of claim 1, wherein the movable portion includes a first mover and a second mover;
wherein the second mover includes a first sidewall, a second sidewall, a third sidewall opposite of and facing the first sidewall, and a fourth sidewall opposite of and facing the second sidewall, the first sidewall has a vertical slot, the fourth sidewall has a matching vertical slot that is opposite of and aligned with the vertical slot; and
wherein the first mover is positioned in the vertical slots, such that the first mover slides relative to the vertical slots when the manual actuator assembly moves the latching assembly from the locked position to the unlocked position and vice-versa.

13. The actuator assembly of claim 1, wherein the anchored portion includes an anchor aperture and an anchor pin, the anchor pin has a first end segment, a second end segment, and a middle segment positioned therebetween; and
wherein the first and second end segments are positioned in respective apertures of the quick coupler, and the middle segment is positioned inside of the quick coupler and in the anchor aperture.

14. The actuator assembly of claim 13, wherein the remote actuator assembly includes a stabilizing cylinder;
wherein the middle segment includes a large diameter portion that is larger than a diameter of the anchor aperture and includes a small diameter portion that is smaller than the diameter of the anchor aperture;
wherein the large diameter portion and the stabilizing cylinder are positioned on opposite sides of the anchor aperture, so as to confine the anchor aperture; and
wherein the small diameter portion is positioned in the anchor aperture and in the stabilizing cylinder.

15. The actuator assembly of claim 1, wherein when the first mover extends:
the first mover is configured to move the second mover via an end of the slot, and
the second mover is configured to move the manual actuator assembly via the control rod and to move the latching assembly from the locked position to the unlocked position via the control rod.

16. An actuator assembly for use with a quick coupler, the actuator assembly comprising:
a manual actuator assembly including a lever, the manual actuator assembly configured to be hand actuated from outside of the quick coupler;
a control rod coupled to the manual actuator assembly;
a remote actuator assembly including an anchored portion and a movable portion, the remote actuator assembly coupled to the control rod, the remote actuator assembly configured to be remotely actuated from outside of the quick coupler; and
a latching assembly including a pivoter pivotably coupled to the control rod;
wherein the manual actuator assembly is configured to move the latching assembly from a locked position to an unlocked position via the control rod;
wherein the remote actuator assembly is configured to move the latching assembly from the locked position to the unlocked position via the control rod;
wherein the control rod includes a first end portion pivotably coupled to the manual actuator assembly, a second end portion pivotably coupled to the latching assembly, and a middle portion positioned therebetween;
wherein the anchored portion is anchored to the quick coupler, the movable portion is movable relative to the anchored portion and is configured to initiate back-and-forth movement of the middle portion at a connection point between the movable portion and the middle portion, and the movable portion includes a first mover and a second mover;
wherein the second mover includes a first sidewall, a second sidewall, a third sidewall opposite of and facing the first sidewall, and a fourth sidewall opposite of and facing the second sidewall, the first sidewall has a vertical slot, the fourth sidewall has a matching vertical slot that is opposite of and aligned with the vertical slot; and
wherein the first mover is positioned in the vertical slots, such that the first mover slides relative to the vertical slots when the manual actuator assembly moves the latching assembly from the locked position to the unlocked position and vice-versa.

17. An actuator assembly for use with a quick coupler, the actuator assembly comprising:
a manual actuator assembly including a lever, the manual actuator assembly configured to be hand actuated from outside of the quick coupler;

a control rod coupled to the manual actuator assembly;

a remote actuator assembly including an anchored portion and a movable portion, the remote actuator assembly coupled to the control rod, the remote actuator assembly configured to be remotely actuated from outside of the quick coupler; and a latching assembly including a pivoter pivotably coupled to the control rod;

wherein the manual actuator assembly is configured to move the latching assembly from a locked position to an unlocked position via the control rod;

wherein the remote actuator assembly is configured to move the latching assembly from the locked position to the unlocked position via the control rod;

wherein the control rod includes a first end portion pivotably coupled to the manual actuator assembly, a second end portion pivotably coupled to the latching assembly, and a middle portion positioned therebetween;

wherein the anchored portion is anchored to the quick coupler and the anchored portion includes an anchor aperture and an anchor pin, the anchor pin has a first end segment, a second end segment, and a middle segment positioned therebetween;

wherein the anchored portion is anchored to the quick coupler and the movable portion is movable relative to the anchored portion and is configured to initiate back-and-forth movement of the middle portion at a connection point between the movable portion and the middle portion;

wherein the first and second end segments are positioned in respective apertures of the quick coupler, and the middle segment is positioned inside of the quick coupler and in the anchor aperture;

wherein the middle segment includes a large diameter portion that is larger than a diameter of the anchor aperture and includes a small diameter portion that is smaller than the diameter of the anchor aperture;

wherein the remote actuator assembly includes a stabilizing cylinder;

wherein the large diameter portion and the stabilizing cylinder are positioned on opposite sides of the anchor aperture, so as to confine the anchor aperture; and wherein the small diameter portion is positioned in the anchor aperture and in the stabilizing cylinder.

* * * * *